United States Patent
Suh

(10) Patent No.: US 10,981,561 B2
(45) Date of Patent: Apr. 20, 2021

(54) APPARATUS AND METHOD FOR CONTROLLING HYBRID ELECTRIC VEHICLE

(71) Applicants: HYUNDAI MOTOR COMPANY, Seoul (KR); KIA MOTORS CORPORATION, Seoul (KR)

(72) Inventor: Won Woo Suh, Incheon (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 135 days.

(21) Appl. No.: 16/372,275

(22) Filed: Apr. 1, 2019

(65) Prior Publication Data
US 2020/0164866 A1 May 28, 2020

(30) Foreign Application Priority Data
Nov. 23, 2018 (KR) .......................... 10-2018-0146448

(51) Int. Cl.
*B60W 20/40* (2016.01)
*B60W 20/20* (2016.01)
*B60W 50/08* (2020.01)

(52) U.S. Cl.
CPC ............ *B60W 20/40* (2013.01); *B60W 20/20* (2013.01); *B60W 50/082* (2013.01); *B60W 2400/00* (2013.01); *B60W 2510/0208* (2013.01); *B60W 2510/0657* (2013.01)

(58) Field of Classification Search
CPC .............................. B60W 20/40; B60W 20/20
See application file for complete search history.

(56) References Cited

U.S. PATENT DOCUMENTS

2015/0009153 A1    1/2015   Jin
2018/0281779 A1*  10/2018   Itoyama ................. B60W 30/20

FOREIGN PATENT DOCUMENTS

KR            10-1500098 B1      1/2015

\* cited by examiner

*Primary Examiner* — Derek D Knight
(74) *Attorney, Agent, or Firm* — Mintz Levin Cohn Ferris Glovsky and Popeo, P.C.; Peter F. Corless

(57) ABSTRACT

A hybrid electric vehicle control apparatus increases a speed of an engine in view of a speed of a drive motor when starting the engine, and turns on an engine clutch after identifying a self-operation of the engine, based on a disturbance torque, thereby rapidly synchronizing the engine speed and the drive motor speed and preventing waste of fuel, which in turn improves fuel efficiency.

16 Claims, 7 Drawing Sheets

APPARATUS AND METHOD FOR CONTROLLING HYBRID ELECTRIC VEHICLE

CROSS-REFERENCE TO RELATED APPLICATION

This application claims the benefit of priority to Korean Patent Application No. 10-2018-0146448, filed in the Korean Intellectual Property Office on Nov. 23, 2018, the entire contents of which are incorporated herein by reference.

TECHNICAL FIELD

The present disclosure relates to an apparatus and method for controlling a hybrid electric vehicle.

BACKGROUND

In general, a hybrid vehicle means a vehicle that is driven by an efficient combination of two or more different types of power sources, but in most cases, refers to a vehicle that obtains a driving force by using an engine that burns fuel (e.g., fossil fuel such as gasoline) to obtain a driving force and an electric motor driven by electric power of a battery.

Hybrid electric vehicles may have various structures with an engine and an electric motor as power sources. A parallel hybrid electric vehicle refers to a vehicle that directly transmits mechanical power of an engine to wheels and is assisted by an electric motor, which is driven by electric power of a battery, when necessary. A series hybrid electric vehicle refers to a vehicle that converts mechanical power of an engine to electric power through a generator and drives an electric motor, or charges a battery, with the electric power. Usually, the parallel hybrid electric vehicle is advantageous for high-speed driving or long-distance driving, and the series hybrid electric vehicle is advantageous for city driving or short-distance driving.

Recently, a plug-in hybrid electric vehicle whose battery has a higher capacity than that of a conventional hybrid electric vehicle and can be recharged by plugging it into an external source of electric power has been developed. The plug-in hybrid electric vehicle travels in only an EV mode during short-distance driving and travels in an HEV mode when the battery is depleted. For example, the plug-in hybrid electric vehicle (PHEV) is equipped with a gasoline internal combustion engine and a battery engine and driven by either or both of them similarly to a conventional hybrid electric vehicle, but has a high-capacity, high-voltage battery that can be recharged by external electricity.

SUMMARY

An aspect of the present disclosure provides a hybrid electric vehicle control apparatus and method for increasing a speed of an engine in view of a speed of a drive motor when starting the engine, and turning on an engine clutch after identifying a self-operation of the engine, based on a disturbance torque, thereby rapidly synchronizing the engine speed and the drive motor speed and preventing waste of fuel, which in turn improves fuel efficiency.

The technical problems to be solved by the present disclosure are not limited to the aforementioned problems, and any other technical problems not mentioned herein will be clearly understood from the following description by those skilled in the art to which the present disclosure pertains. Also, it will be easily understood that the aspects and advantages of the present disclosure can be accomplished by the means set forth in the appended claims and combinations thereof.

According to an aspect of the present disclosure, an apparatus for controlling a hybrid electric vehicle includes a starter motor driving device that drives a starter motor, a speed detector that detects a speed of a drive motor, an engine controller that obtains a speed of an engine, and a main controller that controls the starter motor driving device to increase the speed of the engine until a difference between the speed of the engine and the speed of the drive motor satisfies a threshold range when the engine starts without fuel injection.

The main controller may control the engine controller to inject fuel, when the difference between the speed of the engine and the speed of the drive motor satisfies the threshold range.

The apparatus of the present disclosure may further include an engine clutch driving device that drives an engine clutch.

The main controller may control the engine clutch driving device to turn on the engine clutch, when time during which the difference between the speed of the engine and the speed of the drive motor satisfies the threshold range exceeds threshold time.

The main controller may detect a disturbance torque that represents a difference between a target torque of the engine and an output torque of the engine. The main controller may integrate the speed of the engine to calculate the output torque of the engine.

The main controller may control the engine clutch driving device to turn on the engine clutch, when the disturbance torque is less than a reference value.

According to another aspect of the present disclosure, an apparatus for controlling a hybrid electric vehicle includes a starter motor driving device that drives a starter motor, a speed detector that detects a speed of a drive motor, an engine controller that obtains a speed of an engine, an engine clutch driving device that drives an engine clutch, and a main controller that controls the starter motor driving device to increase the speed of the engine until a difference between the speed of the engine and the speed of the drive motor satisfies a threshold range when the engine starts, controls the engine controller to inject fuel, when the difference between the speed of the engine and the speed of the drive motor satisfies the threshold range, and controls the engine clutch driving device to turn on the engine clutch, when time during which the difference between the speed of the engine and the speed of the drive motor satisfies the threshold range exceeds threshold time and a disturbance torque is less than a reference value.

According to another aspect of the present disclosure, a method for controlling a hybrid electric vehicle includes detecting a speed of a drive motor by a speed detector, obtaining a speed of an engine by an engine controller, and controlling a starter motor driving device by a main controller to increase the speed of the engine until a difference between the speed of the engine and the speed of the drive motor satisfies a threshold range when the engine starts without fuel injection.

The controlling of the starter motor driving device may include controlling the engine controller to inject fuel, when the difference between the speed of the engine and the speed of the drive motor satisfies the threshold range.

The controlling of the starter motor driving device may further include controlling an engine clutch driving device to turn on an engine clutch, when time during which the difference between the speed of the engine and the speed of the drive motor satisfies the threshold range exceeds threshold time.

The controlling of the starter motor driving device may further include controlling an engine clutch driving device to turn on an engine clutch, when time during which the difference between the speed of the engine and the speed of the drive motor satisfies the threshold range exceeds threshold time and a disturbance torque is less than a reference value. The controlling of the starter motor driving device may further include detecting the disturbance torque that represents a difference between a target torque of the engine and an output torque of the engine. Furthermore, the controlling of the starter motor driving device may further include integrating the speed of the engine to calculate the output torque of the engine.

BRIEF DESCRIPTION OF THE DRAWINGS

The above and other aspects, features and advantages of the present disclosure will be more apparent from the following detailed description taken in conjunction with the accompanying drawings.

DETAILED DESCRIPTION

Figure 1:
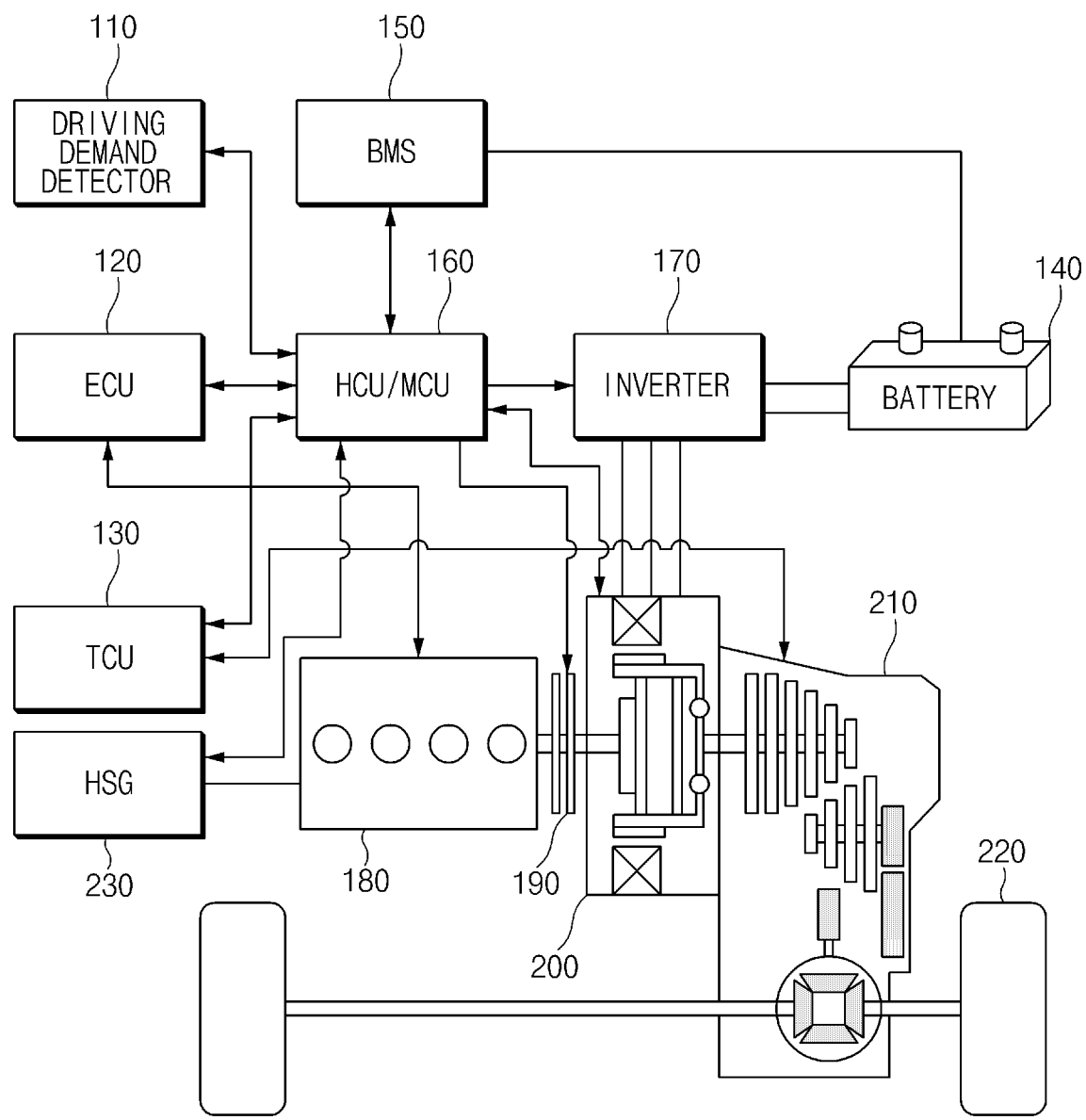
FIG. 1 is a view illustrating an example of a hybrid electric vehicle of a transmission mounted electric device (TMED) type used in the present disclosure.

Hereinafter, embodiments of the present disclosure will be described in detail with reference to the accompanying drawings. It should be understood that even if shown in different drawings, identical components are provided with identical reference numerals in the drawings. Furthermore, in describing the embodiments of the present disclosure, detailed descriptions related to well-known functions or configurations will be omitted when they may make subject matters of the present disclosure unnecessarily obscure.

Terms, such as "first", "second", "A", "B", "(a)", "(b)", and the like, may be used herein to describe components of the present disclosure. Such terms are only used to distinguish one component from another component, and the substance, sequence, order, or number of these components is not limited by these terms. Unless otherwise defined, all terms used herein, including technical and scientific terms, have the same meaning as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

A hybrid electric vehicle includes an engine and a drive motor directly coupled together to serve as driving power sources, a clutch and a transmission for power transmission, an inverter for driving the engine and the drive motor, a high-voltage battery, and the like. In addition, the hybrid electric vehicle includes a hybrid control unit (HCU), a motor control unit (MCU), a battery management system (BMS), and the like that are communicatively coupled together via CAN communication to serve as control means for the components mentioned above.

In particular, a hybrid electric vehicle of a transmission mounted electric device (TMED) type, in which a motor is located toward a transmission and an engine clutch is provided between the motor and an engine, turns on the engine clutch to transmit power of the engine to a drive system through a drive motor.

In one implementation of a hybrid electric vehicle control technology, a controller of the vehicle repeatedly controls to drive and stop an engine so as to improve the fuel efficiency of a hybrid electric vehicle during driving and controls a starter motor to drive the revolution per minute (RPM) of the engine to a reference value (a peak RPM) so as to stably start the engine. In this case, a process of matching the RPM of the engine with the RPM of a drive motor has to be performed to turn on an engine clutch, and therefore fuel may be unnecessarily consumed in the process of driving the RPM of the engine to the reference value (the peak RPM).

In conclusion, the hybrid electric vehicle control technology may increase the RPM of the engine more than necessary without regard to the RPM of the drive motor when starting the engine, which may lead to deterioration in the fuel efficiency of the hybrid electric vehicle.

FIG. 1 is a view illustrating an example of a hybrid electric vehicle of a TMED type used in the present disclosure.

As illustrated in FIG. 1, in embodiments, the hybrid electric vehicle of a TMED type used in the present disclosure may include a driving demand detector 110, an electronic control unit (ECU) 120, a transmission control unit (TCU) 130, a high-voltage battery 140, a BMS 150, an HCU/MCU 160, an inverter 170, an engine 180, an engine clutch 190, a motor 200, a transmission 210, drive wheels 220, and a hybrid starter generator (HSG) 230.

The driving demand detector 110 detects a driver's demand signals that include accelerator position sensor (APS) displacement, throttle valve displacement, and brake pedal displacement that are the driver's driving demands, and outputs information about the detected demand signals.

The ECU 120 controls an overall operation of the engine 180 in response to a request of the HCU/MCU 160 that is a high-level controller. In particular, the ECU 120 performs overall control relating to fuel injection of the engine 180.

The TCU 130 determines a target gear for up/down according to the current vehicle speed and the throttle valve displacement and controls the gear ratio of the transmission 110. When the target gear is determined, the TCU 130 requests slip control of the engine clutch 190 from the HCU/MCU 160 that is a high-level controller.

The high-voltage battery 140 supplies operating voltage to the motor 200 in a hybrid mode and a motor mode and is recharged by regenerative energy collected through the motor 200 in a regenerative braking mode by application of a brake.

The BMS 150 conducts comprehensive detection of information such as the voltage, current, and temperature of the high-voltage battery 140 and manages and controls the state of charge (SOC) and the amount of charge/discharge current of the high-voltage battery 140.

The HCU/MCU 160 performs integrated control on the control units according to the driver's driving demands and the vehicle's state information to control the output torques of the engine 180 and the motor 200, thereby controlling an overall behavior of the vehicle. In particular, the MCU controls ON and OFF of the engine clutch 190, and the HCU controls the HSG 230.

When receiving a request for slip control of the engine clutch 190 from the TCU 130, the HCU/MCU 160 performs the slip control of the engine clutch 190 by determining a hydraulic pressure for target slip control and operating a hydraulic control solenoid, which engages and disengages the engine clutch 190, with electric current corresponding to the relevant hydraulic pressure.

The inverter 170 is an insulated gate bipolar transistor (IGBT) switch element. The inverter 170 drives the motor 200 by converting DC voltage of the high-voltage battery 140 to three-phase AC voltage according to a pulse width modulation (PWM) control signal applied by the HCU/MCU 160.

The output power of the engine 180 is controlled by the ECU 120, and the amount of intake air may be regulated through electric throttle control (ETC).

The engine clutch 190 is disposed between the engine 180 and the motor 200. In the hybrid mode, the engine clutch 190 causes the output torque of the engine 180 to be added to the output torque of the motor 200 and the total output torque to be applied to the transmission 110.

The motor 200 is driven by voltage of the high-voltage battery 140 that is applied through the inverter 170.

The gear ratio of the transmission 210 is regulated under the control of the TCU 130, and the transmission 210 distributes and transmits the total output torque, which is applied by the engine clutch 190, through a synchronized gear ratio to the drive wheels 220 to enable the vehicle to be driven.

The HSG 230 operates in conjunction with the engine 180 through a belt. The HSG 230, when starting the engine 180, receives AC power from the MCU and operates as a starter motor to provide a driving force to the engine 180. After the start of the engine 180, the HSG 230 receives a driving force from the engine 180 and operates as a generator that generates three-phase AC power. The HSG 230 assists with torque control of the engine 180 to improve responsiveness. The belt is used to couple the HSG 230 with the engine 180, but the torque control may be performed in view of the tension in the belt. A main pulley is mounted on a crank shaft of the engine 180 and rotates together with the crank shaft. The main pulley is coupled with an auxiliary pulley of the HSG 230 through the belt and rotates together with the auxiliary pulley. The belt is set forth as an example of a power transmission means that is commonly used as a means for transmitting a driving force to the engine 180 of the vehicle, and other power transmission means, such as a chain and a gear, may be involved.

Figure 2:
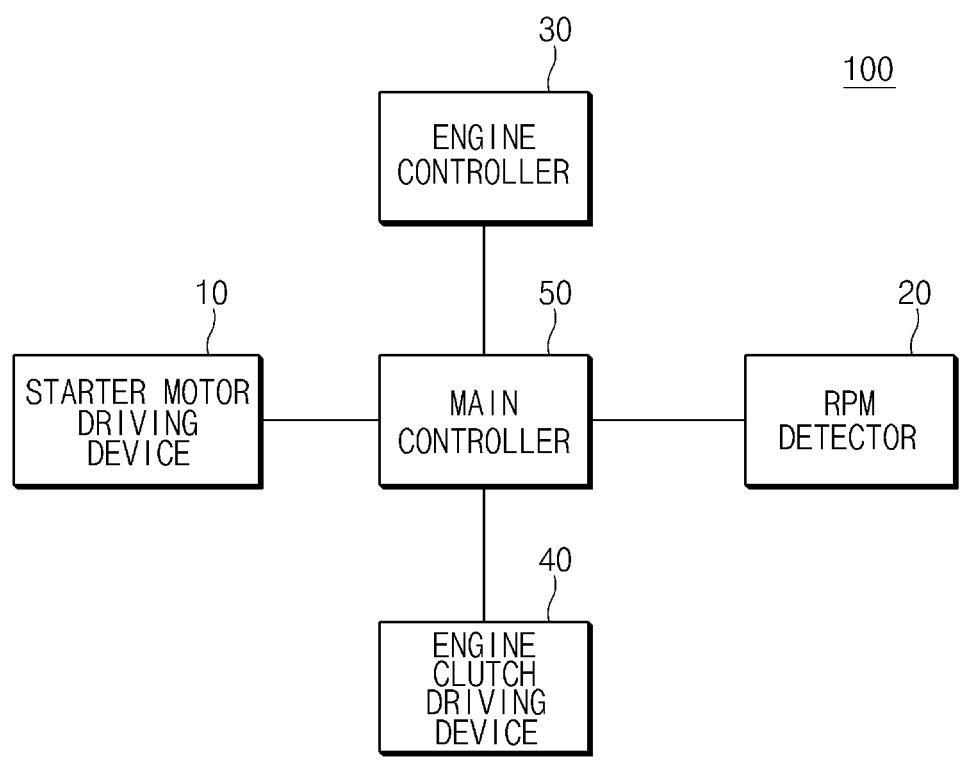
FIG. 2 is a view illustrating a configuration of an apparatus for controlling a hybrid electric vehicle according to an embodiment of the present disclosure.

FIG. 2 is a view illustrating a configuration of an apparatus for controlling a hybrid electric vehicle according to an embodiment of the present disclosure.

As illustrated in FIG. 2, the hybrid electric vehicle control apparatus 100 according to the embodiment of the present disclosure may include a starter motor driving device 10, a revolution per minute (RPM) detector 20, an engine controller 30, an engine clutch driving device 40, and a main controller 50. The components may be integrated according to manners of carrying out the hybrid electric vehicle control apparatus 100 according to the embodiment of the present disclosure. In addition, some of the components may be omitted according to manners of carrying out the invention.

The starter motor driving device 10, which is a kind of actuator, may be implemented with, for example, the motor control unit (MCU). The starter motor driving device 10 drives the starter motor to increase the RPM of the engine 180. In this case, the starter motor refers to the HSG 230.

The RPM detector or speed detector 20 may be implemented with, for example, the motor control unit (MCU). The RPM detector 20 detects the RPM or rotational speed of the drive motor 200. Here, the RPM detector 20, which is a kind of speed detector, may detect the speed of the drive motor 200.

The engine controller 30 may be implemented with, for example, the engine control unit (ECU). The engine controller 30 performs overall control relating to fuel injection, such as time to inject fuel, the amount of fuel to be injected, and the like.

The engine controller 30 may obtain the RPM of the engine 180. Here, the RPM of the engine 180 refers to the speed of the engine 180.

The engine clutch driving device 40, which is a kind of actuator, turns on/off the engine clutch 190.

The main controller 50 performs overall control to enable the components to perform the functions thereof normally. The main controller 50 may be implemented in a hardware or software form, or may be implemented in a form in which hardware and software are combined together. The main controller 50 may preferably be implemented with, but is not limited to, a microprocessor.

The main controller 50 may be implemented with the HCU and may include storage that stores various types of logic, algorithms, and programs that are required to increase the RPM of the engine 180 in view of the RPM of the drive motor 200 when starting the engine 180 and turn on the engine clutch 190 after identifying a self-operation of the engine 180, based on a disturbance torque. In this case, the storage may include at least one type of storage medium among memories of a flash memory type, a hard disk type, a micro type, and a card type (e.g., a secure digital (SD) card or an eXtream digital (XD) card) and memories of a random access memory (RAM) type, a static RAM (SRAM) type, a read-only memory (ROM) type, a programmable ROM (PROM) type, an electrically erasable PROM (EEPROM) type, a magnetic RAM (MRAM) type, a magnetic disk type, and an optical disk type.

The main controller 50 may detect a disturbance torque that represents a difference between a target torque of the engine 180 and an output torque of the engine 180. In this case, the main controller 50 may calculate the output torque of the engine 180 by integrating the RPM (velocity) of the engine 180 obtained through the engine controller 30. For reference, the method itself of calculating the disturbance torque is a well-known and common technology.

The main controller 50 controls the starter motor driving device 10 to increase the RPM of the engine 180 until a difference between the engine RPM and the drive motor RPM satisfies a threshold range. When the difference between the engine RPM and the drive motor RPM satisfies the threshold range, the main controller 50 controls the engine controller 30 to inject fuel.

Furthermore, when time during which the difference between the engine RPM and the drive motor RPM satisfies the threshold range exceeds threshold time and the disturbance torque is less than a reference value, the main controller 50 controls the engine clutch driving device 40 to turn on the engine clutch 190.

Figure 3A:
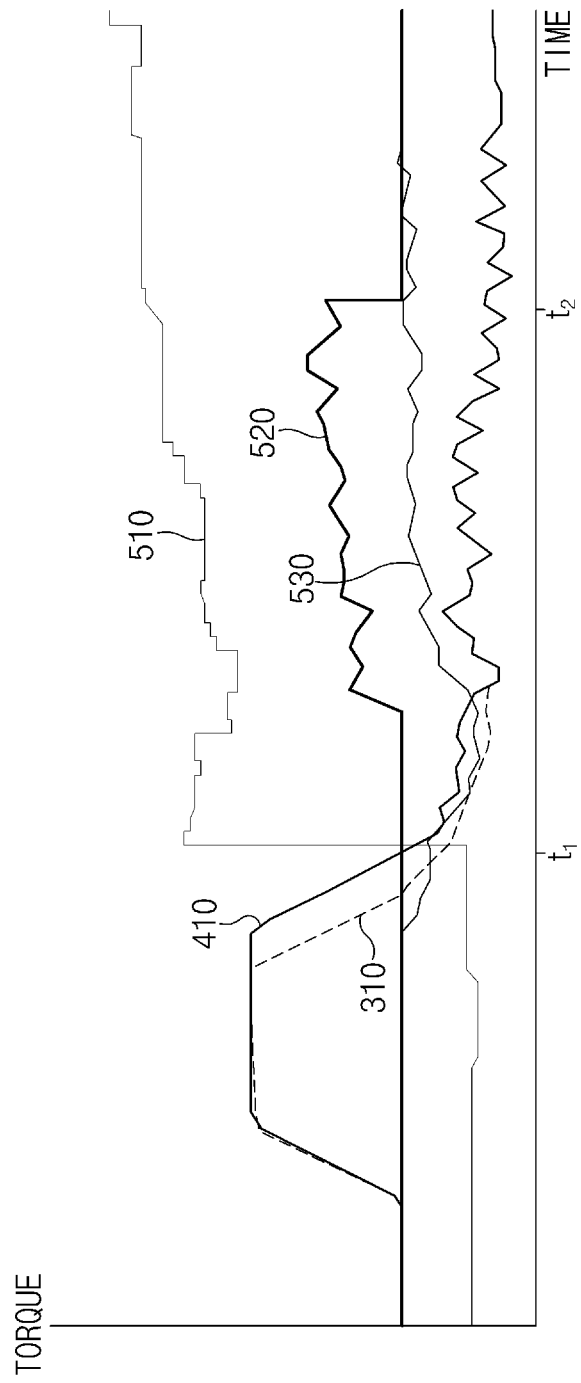
FIG. 3A is a view illustrating a process of controlling, by a main controller, torques of a starter motor according to an embodiment of the present disclosure.
Figure 3B:
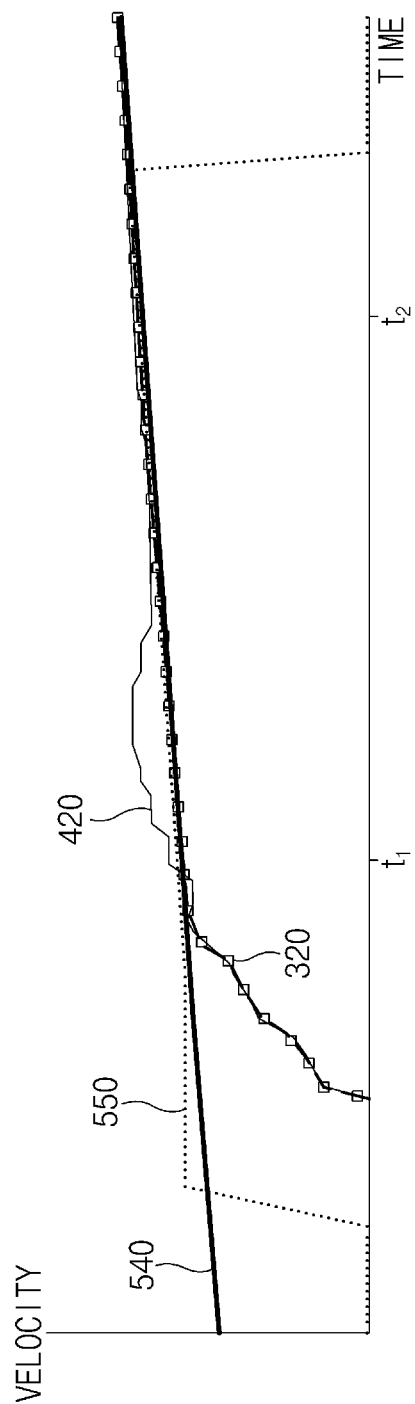
FIG. 3B is a view illustrating velocities of an engine corresponding to the torques of the starter motor according to an embodiment of the present disclosure.
Figure 3C:
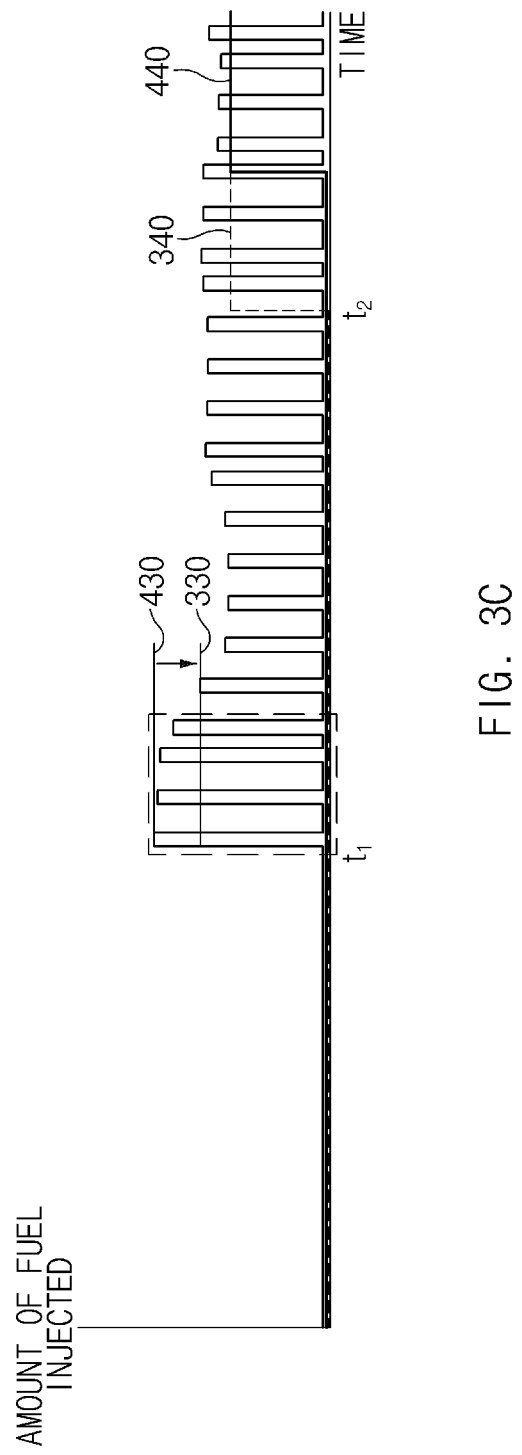
FIG. 3C is a view illustrating a process of controlling, by the main controller, the amount of fuel injected according to an embodiment of the present disclosure.

Hereinafter, an operation of the main controller 50 will be described in detail with reference to FIGS. 3A to 3C.

Reference numeral 510 represents torques of an engine, reference numeral 520 represents disturbance torques, and reference numeral 530 represents torques (feedback torques) caused by a difference between a target speed and an engine speed. Reference numeral 540 represents RPMs of a drive motor, and reference numeral 550 represents target RPMs for turning on an engine clutch. The RPMs 540 of the drive motor are in agreement with the target RPMs 550.

Reference numeral 310 represents torques of a starter motor according to the present disclosure, and reference numeral 320 represents RPMs of the engine that correspond to the torques 310 of the starter motor according to the present disclosure.

Reference numeral 410 represents torques of a starter motor according to the related art, and reference numeral 420 represents RPMs of an engine that correspond to the torques 410 of the starter motor according to the related art.

In embodiments, the main controller 50 controls the starter motor driving device 10 to cause the engine RPMs 320 to follow the drive motor RPMs 540. For example, the main controller 50 controls the starter motor driving device 10 to cause differences between the engine RPMs 320 and the drive motor RPMs 540 to satisfy a threshold range.

In the related art, the engine RPMs 420 are driven to a reference value (a peak RPM), and therefore fuel efficiency is deteriorated due to a large amount of fuel injected. Reference numeral 330 represents the amount of fuel injected according to the present disclosure, and reference numeral 430 represents the amount of fuel injected according to the related art. It can be seen that the amount 430 of fuel injected according to the related art is more than the amount 330 of fuel injected according to the present disclosure.

Furthermore, in embodiments, it can be seen that the engine RPMs 320 and the drive motor RPMs 540 rapidly synchronize so that a period 340 during which the engine clutch according to the present disclosure is turned on precedes a period 440 during which an engine clutch according to the related art is turned on.

However, because the engine RPMs 320 according to the present disclosure are not driven to a reference value (a peak RPM) unlike in the related art, whether the engine performs a self-operation (the completion of engine start-up in a state in which the engine operates by itself) for threshold time during which the differences between the engine RPMs 320 and the drive motor RPMs 540 satisfy the threshold range cannot be seen.

Accordingly, the main controller 50 may identify the self-operation of the engine, based on the disturbance torques 520. For example, when the disturbance torques 520 are less than a reference value, the main controller 50 controls the engine clutch driving device 40 to turn on the engine clutch.

Figure 4:
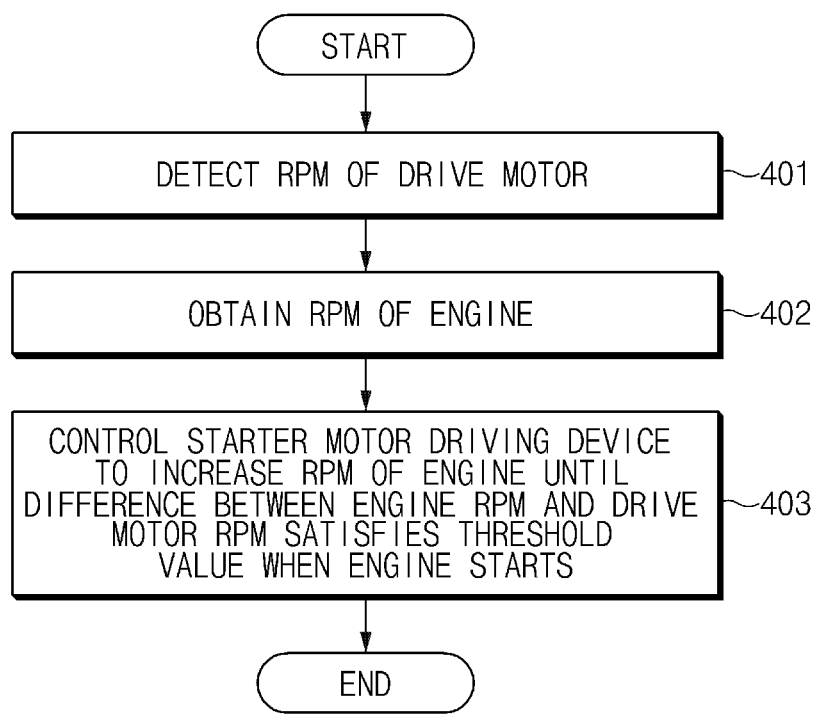
FIG. 4 is a flowchart illustrating a method for controlling a hybrid electric vehicle according to an embodiment of the present disclosure.

FIG. 4 is a flowchart illustrating a method for controlling a hybrid electric vehicle according to an embodiment of the present disclosure.

First, the RPM detector 20 detects the RPM of a drive motor (Step 401).

Next, the engine controller 30 obtains the RPM of an engine (Step 402).

Then, the main controller 50 controls the starter motor driving device 10 to increase the RPM of the engine until a difference between the RPM of the engine and the RPM of the drive motor satisfies a threshold range when the engine starts (Step 403).

Through the process described above, the main controller 50 may rapidly synchronize the engine RPM and the drive motor RPM and may avoid or minimize waste of fuel, thereby improving fuel efficiency.

Figure 5:
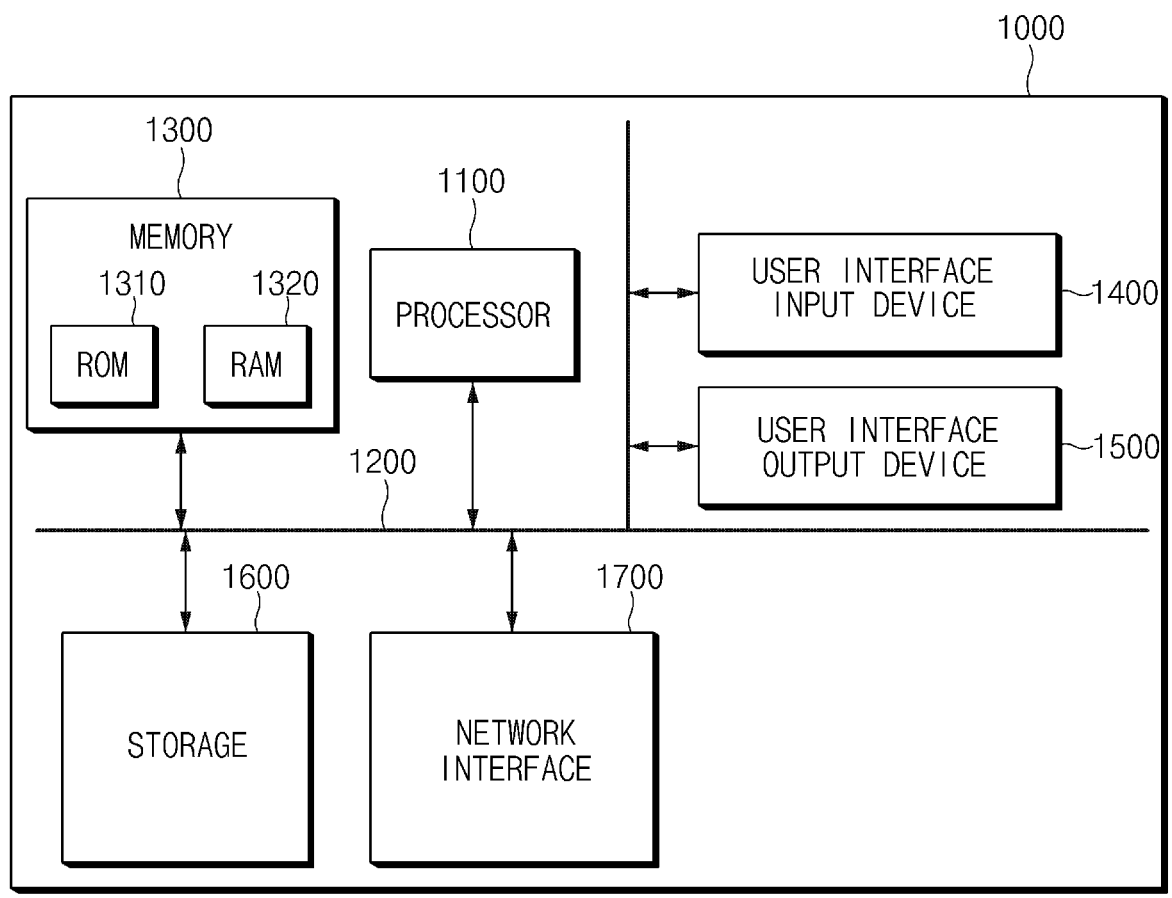
FIG. 5 is a block diagram illustrating a computing system for executing a method for controlling a hybrid electric vehicle according to an embodiment of the present disclosure.

FIG. 5 is a block diagram illustrating a computing system for executing a method for controlling a hybrid electric vehicle according to an embodiment of the present disclosure.

Referring to FIG. 5, the above-described hybrid electric vehicle control method according to the embodiment of the present disclosure may also be implemented through the computing system. The computing system 1000 may include at least one processor 1100, a memory 1300, a user interface input device 1400, a user interface output device 1500, storage 1600, and a network interface 1700 that are coupled together through a system bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage mediums. For example, the memory 1300 may include a read only memory (ROM) 1310 and a random access memory (RAM) 1320.

Accordingly, the steps of the methods or algorithms described in relation to the embodiments disclosed herein may be directly implemented with a hardware module or a software module executed by the processor 1100, or a combination thereof. The software module may reside in a storage medium (e.g., the memory 1300 and/or the storage 1600) such as a RAM memory, a flash memory, a ROM memory, an EPROM memory, an EEPROM memory, a register, a hard disk, a solid state drive (SSD), a detachable disk, or a CD-ROM. The storage medium may be coupled to the processor 1100, and the processor 1100 may read information out of the storage medium and may record information in the storage medium. Alternatively, the storage medium may be integrated with the processor 1100. The processor 1100 and the storage medium may reside in an application specific integrated circuit (ASIC). The ASIC may reside in a user terminal. In another case, the processor 1100 and the storage medium may reside in the user terminal as separate components.

According to the embodiments of the present disclosure, the hybrid electric vehicle control apparatus and method may increase the RPM of the engine in view of the RPM of the drive motor when starting the engine and may turn on the engine clutch after identifying the self-operation of the engine, based on the disturbance torque, thereby rapidly synchronizing the engine speed and the drive motor speed and preventing waste of fuel, which in turn improves fuel efficiency.

Logical blocks, modules or units described in connection with embodiments disclosed herein can be implemented or performed by a computing device having at least one processor, at least one memory and at least one communication interface. The elements of a method, process, or algorithm described in connection with embodiments disclosed herein can be embodied directly in hardware, in a software module executed by at least one processor, or in a combination of the two. Computer-executable instructions for implementing a method, process, or algorithm described in connection with embodiments disclosed herein can be stored in a non-transitory computer readable storage medium.

Hereinabove, although the present disclosure has been described with reference to embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, the embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims, and all the technical ideas within the scope equivalent to the claims should be included in the scope of the present disclosure.

What is claimed is:

1. An apparatus for controlling a hybrid electric vehicle, the apparatus comprising:
   a starter motor driving device configured to drive a starter motor;
   a speed detector configured to detect a speed of a drive motor;
   an engine controller configured to obtain a speed of an engine; and
   a main controller configured to control the starter motor driving device to increase the speed of the engine until a difference between the speed of the engine and the speed of the drive motor is within a threshold range when the engine starts.

2. The apparatus of claim 1, wherein the main controller is configured to control the engine controller to inject fuel, when the difference between the speed of the engine and the speed of the drive motor is within the threshold range.

3. The apparatus of claim 1, further comprising:
   an engine clutch driving device configured to drive an engine clutch.

4. The apparatus of claim 3, wherein the main controller is configured to control the engine clutch driving device to turn on the engine clutch, when time during which the difference between the speed of the engine and the speed of the drive motor is in the threshold range exceeds threshold time.

5. The apparatus of claim 3, wherein the main controller is configured to detect a disturbance torque that represents a difference between a target torque of the engine and an output torque of the engine.

6. The apparatus of claim 5, wherein the main controller is configured to integrate the speed of the engine to calculate the output torque of the engine.

7. The apparatus of claim 3, wherein the main controller is configured to control the engine clutch driving device to turn on the engine clutch, when a disturbance torque is less than a reference value.

8. An apparatus for controlling a hybrid electric vehicle, the apparatus comprising:
   a starter motor driving device configured to drive a starter motor;
   a speed detector configured to detect a speed of a drive motor;
   an engine controller configured to obtain a speed of an engine;
   an engine clutch driving device configured to drive an engine clutch; and
   a main controller configured to control the starter motor driving device to increase the speed of the engine until a difference between the speed of the engine and the speed of the drive motor is within a threshold range when the engine starts, control the engine controller to inject fuel, when the difference between the speed of the engine and the speed of the drive motor is within the threshold range, and control the engine clutch driving device to turn on the engine clutch, when time during which the difference between the speed of the engine and the speed of the drive motor is within the threshold range exceeds threshold time and a disturbance torque is less than a reference value.

9. The apparatus of claim 8, wherein the main controller is configured to detect the disturbance torque that represents a difference between a target torque of the engine and an output torque of the engine.

10. The apparatus of claim 9, wherein the main controller is configured to integrate the speed of the engine to calculate the output torque of the engine.

11. A method for controlling a hybrid electric vehicle, the method comprising:
    detecting a speed of a drive motor by a speed detector;
    obtaining a speed of an engine by an engine controller; and
    controlling a starter motor driving device by a main controller to increase the speed of the engine until a difference between the speed of the engine and the speed of the drive motor satisfies a threshold range when the engine starts without fuel injection.

12. The method of claim 11, wherein the controlling of the starter motor driving device includes:
    controlling the engine controller to inject fuel, when the difference between the speed of the engine and the speed of the drive motor satisfies the threshold range.

13. The method of claim 12, wherein the controlling of the starter motor driving device further includes:
    controlling an engine clutch driving device to turn on an engine clutch, when time during which the difference between the speed of the engine and the speed of the drive motor satisfies the threshold range exceeds threshold time.

14. The method of claim 12, wherein the controlling of the starter motor driving device further includes:
    controlling an engine clutch driving device to turn on an engine clutch, when time during which the difference between the speed of the engine and the speed of the drive motor is in the threshold range exceeds threshold time and a disturbance torque is less than a reference value.

15. The method of claim 14, wherein the controlling of the starter motor driving device further includes:
    detecting the disturbance torque that represents a difference between a target torque of the engine and an output torque of the engine.

16. The method of claim 15, wherein the controlling of the starter motor driving device further includes:
    integrating the speed of the engine to calculate the output torque of the engine.

* * * * *